Dec. 2, 1969   F. L. JOHNSON, JR., ET AL   3,481,837
METHOD FOR THE PURIFICATION OF METHOXYACETALDEHYDE
Filed June 29, 1966
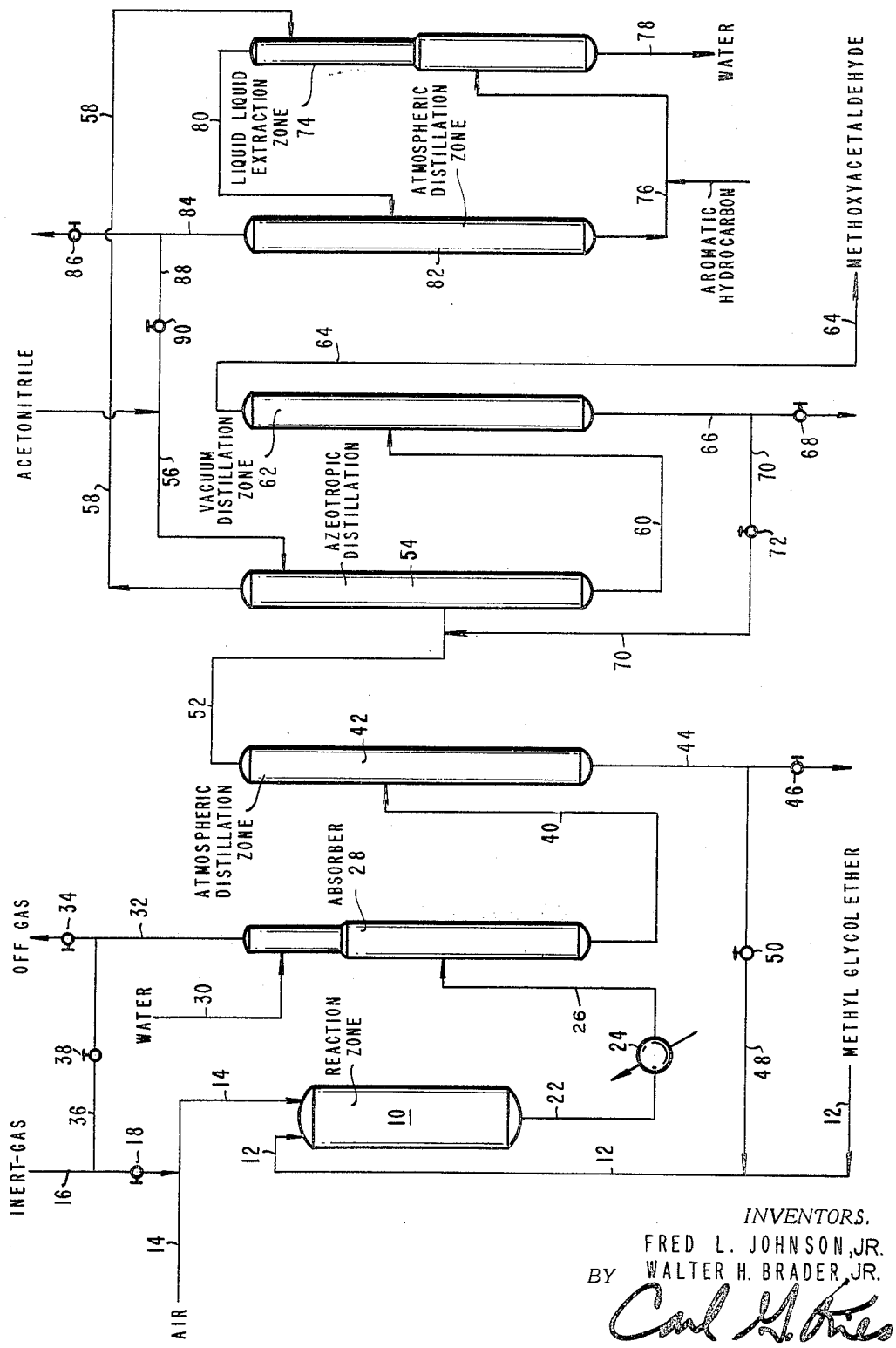
INVENTORS.
FRED L. JOHNSON, JR.
WALTER H. BRADER, JR.
BY
ATTORNEY.

United States Patent Office 3,481,837
Patented Dec. 2, 1969

3,481,837
METHOD FOR THE PURIFICATION OF METHOXYACETALDEHYDE
Fred L. Johnson, Jr., and Walter H. Brader, Jr., Austin, Tex., assignors to Jefferson Chemical Company, Inc., Houston, Tex., a corporation of Delaware
Filed June 29, 1966, Ser. No. 561,495
Int. Cl. B01d *3/34, 3/10*
U.S. Cl. 203—46          4 Claims

ABSTRACT OF THE DISCLOSURE

Methoxyacetaldehyde contaminated with water and methanol is purified by azetropically distilling the contaminated methoxyacetaldehyde in the presence of acetonitrile and removing the acetonitrile fraction which contains most of the methanol and water contaminants.

---

This invention relates to a method for the purification of methoxyacetaldehyde. More particularly, this invention relates to a method for the purification of methoxyacetaldehyde contaminated with methanol and water.

It has heretofore been proposed to prepare methoxyacetaldehyde by the oxidation of monomethyl glycol ether in the presence of a silver catalyst. Unfortunately, there has been a concomitant production of a minor amount of methanol as a by-product.

Methoxyacetaldehyde boils at 92° C. and methanol at 64° C. at atmospheric pressure. However, despite the 28° C. boiling point difference, a complete separation of methanol from methoxyacetaldehyde is obtainable only with great difficulty. For example, a freshly distilled 283 gram methoxyacetaldehyde fraction which was about 25% methanol was carefully fractionated at atmospheric pressure through a three-quarter-inch by four-foot Stedman column using a reflux ratio of ten to one. The methanol originally present was separated in the first three fractions; the head temperature rose to 85° C. after the third fraction and remained constant throughout the rest of the distillation. Despite the fact that the head temperature was 21° C. above the methanol boiling point, methanol was found in each of the thirteen fractions boiling at 85° C., and the methanol concentration was fairly constant in each of the fractions at 20%.

As can be seen from the foregoing, the removal of the methanol contaminant from methoxyacetaldehyde presented a serious problem.

It has been discovered in accordance with the present invention, however, that this problem can be overcome by submitting a methoxyacetaldehyde product which is contaminated with 10% or more of methanol and water to azetropic distillation with acetonitrile to obtain a lower boiling distillate fraction containing most of the said methanol and water and a higher boiling methoxyacetaldehyde fraction containing less than about 5% of water and methanol. When the higher boiling methoxyacetaldehyde fraction is obtained as the bottoms fraction it may be redistilled (e.g., by vacuum distillation) to obtain a distillate methoxyacetaldehyde product, free from residue, containing only a minor amount of methanol and water.

The crude methoxyacetaldehyde can be prepared from monomethyl glycol ether by catalytic oxidation in the presence of a silver catalyst as shown, for example, in United States Patents Nos. 2,000,604, 2,170,854, 2,286,034 and 2,590,896 and my copending application Ser. No. 561,631, filed on an even date herewith and entitled "Production of Alkoxyacetaldehydes."

The invention will be further illustrated in connection with the accompanying drawing, wherein the single figure is a schematic flow sheet illustrating the preferred method for the practice of the present invention. In the interest of simplicity, conventional equipment associated with the reactor and distillation columns has been omitted, such as heat exchangers, reflux condensers, reboilers, temperature control devices, etc.

Turning now to the drawing, there is disclosed a reaction zone 10, to which an alkyl glycol ether such as monomethyl glycol ether is charged by way of a line 12 and to which an oxygen-containing feed gas is charged by way of a line 14. The air is suitably diluted with nitrogen or any other suitable inert gas charged to line 14 by a branch line 16 controlled by a valve 18. The reactor in reaction zone 10 is suitable a tubular reactor wherein the temperature is regulated by means of a suitable heat exchange medium such as an aromatic hydrocarbon (e.g., a diphenyl or a diphenyl oxide, or a mixture thereof).

The effluent from the reactor 10, which is discharged by way of a line 22, will contain, for example, off gas and liquid components. The effluent is passed through a heat exchanger 24, thence by way of a line 26 to a water scrubbing tower 28 where it is scrubbed with water charged by a line 30. Off gas is discharged by way of a line 32 controlled by a valve 34. All or part of the off gas may be recycled to line 16 by a branch line 36 controlled by a valve 38. The liquid components are discharged from scrubber 28 by way of a line 40 and will contain methoxyacetaldehyde, unreacted monomethyl glycol ether, water, methanol and traces of formaldehyde.

The liquid product 40 is charged a first distillation zone 42, which preferably comprises an atmospheric distillation column where it is separated into a monomethyl glycol ether recycle fraction which is withdrawn from the tower 42 by way of a line 44 controlled by a valve 46 and is composed principally of unreacted monomethyl glycol ether. All or a part of the fraction 44 may suitably be recycled by way of a line 48 controlled by a valve 50. The fraction 52 withdrawn from the distillation zone 42 may contain, for example, methoxyacetaldehyde, water and methanol.

In order to overcome the problem of purification that is encountered because of the azeotropes that methoxyacetaldehyde forms with water and methanol, the fraction 52 is charged to an azeotropic distillation zone 54, to which acetonitrile is also charged by way of a line 56 for azeotropic distillation in order to recover an overhead azeotrope fraction 58 containing acetonitrile, most of the methanol and water and minor amounts of methoxyacetaldehyde. For example, when operating the tower 54 at a head temperature of about 76° C., a reflux ratio of about 3:1 and a ratio of feed to acetonitrile of about 1.5:1, about 96% of the methoxyacetaldehyde in the line 40 will appear in bottoms fraction 60 withdrawn from the tower 54.

Bottoms fraction 60 is preferably subjected to vacuum distillation in a third distallation zone 62 from which methoxyacetaldehyde is recovered by line 64. Bottoms from the zone 62 are discharged by a line 66 controlled by a valve 68. All or a part of bottoms fraction 66 may be recycled to zone 54 by way of a branch line 70 controlled by a valve 72.

The distillate fraction 58 from the tower 54 is suitably charged to a countercurrent extraction column 74, wherein it is countercurrently extracted with an aromatic hydrocarbon such as xylene, which is charged by way of a line 76. The raffinate is discharged from the zone 74 by way of a line 78, and the extract is discharged by a line 80 and passed to a distillation column 82, wherein acetonitrile is recovered overhead by line 84 controlled by a valve 86 and is suitably recycled to line 56 by a branch line 88 controlled by a valve 90. Xylene is recovered by way of line 76 for recycle to the extraction column 74. The process for separation of acetonitrile from aromatic hydrocarbons is disclosed, for example, in U.S. Patent No. 2,590,986.

The invention will be further illustrated with respect to the following specific examples, which are given by way of illustration and not as limitations on the scope of this invention. Where parts are given, they are parts by weight.

EXAMPLE I

The crude effluent from a single representative pass through the methoxyacetaldehyde reactor consisted of about 40% methoxyacetaldehyde, 43% unreacted methyl glycol ether, 13.5% water, 2.3% methanol and traces of formaldehyde. A single continuous distillation produced colorless overhead product containing about 76% methoxyacetaldhyde, 16.6% water and 4.4% methanol. Losses of methoxyacetaldehyde from polymerization during this distillation were negligible and the product was completely stable.

Further purification of the methoxyacetaldehyde was difficult due to the azeotropes and compounds formed between the aldehyde, water and methanol.

EXAMPLE II

Azeotropic distillation

Charge preheated methoxyacetaldehyde feed (Example I overhead) to a continuous distillation column at a point one-third of the way from the bottom, and preheated acetonitrile into the column at the center point using a feed to acetonitrile ratio of about 2:1, a reflux ratio of about 6:2, a head temperature of about 76° C. and a bottoms temperature of about 92° C. Of the methoxyacetaldehyde fed, about 95% appears in the bottoms, with the remainder going overhead with the acetonitrile. Loss of methoxyacetaldehyde due to reaction during distillation is negligible. The composition of the bottoms from this azeotropic distillation is at least 90% methoxyacetaldehyde and less than 2% each of water, methanol and acetonitrile.

If desired, the bottoms may be subjected to vacuum distillation to remove minor quantities of residue, if any, which contain color-forming bodies or impurities.

EXAMPLE III

Unsuccessful purification methods for methoxyacetaldehyde

Numerous azeotroping agents were tried for separating water and methanol from methoxyacetaldehyde. In addition, materials were added to the distillation pot in an effort to react methanol and thereby permit distillation of aldehyde free of methanol. Several compounds were used in an effort to extractively distill methanol from the aldehyde. Table 8 gives the unsuccessful purification schemes tried.

Table 8.—Unsuccessful purification methods for methoxyacetaldehyde

| Compound: | Purpose |
|---|---|
| Benzene | Azeotroping agent. |
| Acetone | Azeotroping agent. |
| Hexene-1 | Azeotroping agent. |
| Tetrachloroethylene | Azeotroping agent. |
| Cyclohexane | Azeotroping agent. |
| Ethyl acetate | Azeotroping agent. |
| Isopropyl alcohol+toluene | Azeotroping agent. |
| n-Propyl alcohol+n - propyl acetate | Azeotroping agent. |
| Acetic anhydride | Reaction with methanol. |
| Phthalic anhydride | Reaction with methanol. |
| Formaldehyde | Reaction with methanol. |
| Ethylene glycol | Extractive distillation. |
| Methyl Carbitol | Extractive distillation. |
| Propylene carbonate | Extractive distillation. |
| Linde 3–A, 4–A and 5–A molecular sieves | Physical removal of water and methanol. |

Having thus described our invention, what is claimed is:

1. A method for the purification of methoxyacetaldehyde contaminated with monomethyl glycol ether and more than 10 wt. percent of methanol and water which comprises the steps of subjecting said contaminated methoxyacetaldehyde to simple distillation to obtain a partially purified methoxyacetaldehyde fraction contaminated with methanol and water and subjecting said contaminated methoxyacetaldehyde to azeotropic distillation in the presence of acetonitrile to obtain a distillate acetonitrile fraction containing most of the methanol water, and acetonitrile and a higher boiling fraction composed primarily of methoxyacetaldehyde and less than about 5% of methanol and water.

2. A method for the purification of a crude reaction product prepared by the catalytic oxidation of monomethyl glycol ether and comprising about 40% to 50% methoxyacetaldehyde, about 35% to 45% of monomethyl glycol ether, water and about 2% to 4% methanol which comprises the steps of subjecting said crude reaction product to simple distillation to obtain a partially purified methoxyacetaldehyde fraction contaminated with methanol and water and azeotropically distilling said partially purified methoxyacetaldehyde fraction in the presence of acetonitrile to obtain a distillate acetonitrile fraction containing most of the methanol, water and acetonitrile and a higher boiling purified methoxyacetaldehyde fraction containing not more than about 5 wt. percent of water and methanol.

3. A method as in claim 2 wherein the lower boiling acetonitrile fraction is resolved by solvent extraction with a liquid aromatic hydrocarbon into a raffinate phase and an extract phase composed principally of aromatic hydrocarbon and acetonitrile, wherein said extract phase is distilled to provide a distillate acetonitrile fraction for reuse in the said azeotroping distillation step and an aromatic hydrocarbon fraction for use in the hydrocarbon extraction step.

4. A method as in claim 2 wherein said higher boiling purified methoxyacetaldehyde fraction is subjected to vacuum distillation in order to remove color-forming impurities.

References Cited

UNITED STATES PATENTS 2,679,472  5/1954  Tooke _____ 203—60

BERNARD HELFIN, Primary Examiner

R. H. LILES, Assistant Examiner

U.S. Cl. X.R.

203—60, 71, 78, 91; 260—602